United States Patent [19]

Fluharty et al.

[11] Patent Number: 4,934,802
[45] Date of Patent: Jun. 19, 1990

[54] RETRACTABLE CONVERSATION MIRROR

[75] Inventors: William J. Fluharty; Ronald A. Dykstra; Pat Binish, all of Holland, Mich.

[73] Assignee: Prince, Holland, Mich.

[21] Appl. No.: 160,121

[22] Filed: Feb. 25, 1988

[51] Int. Cl.⁵ .......................... G02B 7/18; B60R 1/12
[52] U.S. Cl. .................... 350/604; 248/481; 248/483; 350/636; 362/136
[58] Field of Search ............... 296/97 R, 97 C, 97 F; 248/486, 549, 900, 481, 483; 362/135, 136, 142, 144; 350/604, 606, 629, 625, 636

[56] References Cited

U.S. PATENT DOCUMENTS

| | | |
|---|---|---|
| 2,097,419 | 10/1937 | Schmidt . |
| 2,276,585 | 3/1942 | Mandel ................. 296/97 |
| 2,432,674 | 10/1947 | Office ................... 296/97 |
| 2,894,576 | 7/1959 | Williams . |
| 3,146,296 | 8/1964 | Fischer .................. 350/625 |
| 3,375,053 | 3/1969 | Ward .................... 350/625 |
| 3,424,517 | 1/1969 | Budreck ................. 350/625 |
| 4,054,375 | 10/1977 | Ribeca . |
| 4,090,733 | 5/1978 | Altschul ................. 296/97 |
| 4,449,786 | 5/1984 | McCord ................. 350/629 |
| 4,486,819 | 12/1984 | Marcus et al. .......... 362/142 |
| 4,624,499 | 11/1986 | Flowerday ............. 362/144 |
| 4,652,982 | 3/1987 | Flowerday ............. 362/135 |
| 4,683,522 | 7/1987 | Viertel et al. .......... 362/137 |
| 4,712,891 | 12/1987 | Midorikawa et al. ... 350/604 |
| 4,733,956 | 3/1988 | Erickson ............... 350/624 |
| 4,740,066 | 4/1988 | Whitehead ............. 350/604 |
| 4,755,033 | 7/1988 | Whitehead et al. .... 350/604 |
| 4,794,497 | 12/1988 | Jonsas et al. .......... 362/137 |

FOREIGN PATENT DOCUMENTS 2710569  9/1978  Fed. Rep. of Germany ...... 350/604
59-114140  7/1984  Japan .

Primary Examiner—Bruce Y. Arnold
Assistant Examiner—Martin Lerner
Attorney, Agent, or Firm—Price Heneveld et al.

[57] ABSTRACT

A relatively small convex mirror is retractably mounted to a housing, located at the roof-line of a vehicle at the center windshield area for movement between a use position extended from the housing to permit a front seat occupant to view the face of a rear seat occupant and a stored position retracted within the housing.

9 Claims, 2 Drawing Sheets

RETRACTABLE CONVERSATION MIRROR

BACKGROUND OF THE INVENTION

The present invention relates to a retractable mirror, employed for establishing eye contact between the front and rear seat passengers in vehicles.

When a driver or passenger is conversing with rear seat passengers, typically in order to establish eye contact, during the course of conversation, it is necessary to turn around and at least partially face the rear seat passenger. In the case of the driver, this distracts the driver from the attention required for driving. Although some incidental eye contact can be established through the rear view mirror, typically the rearview mirror is not adjusted to align with the location of passengers in the rear seats of the vehicle, but rather along the center line of the vehicle for viewing through the rear window.

SUMMARY OF THE PRESENT INVENTION

In order to provide a convenient and nondistracting method by which the driver or passenger can establish eye contact while conversing with rear seat passengers, a retractable mirror is mounted to a housing, mounted to the roof of a vehicle, above the vehicle windshield and an existing rearview mirror. This relatively small mirror is preferably convex and is mounted to the housing to automatically pivot downwardly to a use position and can be retracted and snap-locked into the housing to be less distracting when not in use. Such a system provides a useful device for establishing better communication through eye contact between front and rear seat passengers and in the case of the driver, without undue distraction of the driver from the forward field of view. These and other features, objects, and advantages of the present invention will become apparent upon reading the following description thereof together with reference to the accompanying drawings in which:

DETAILED DESCRIPTION OF THE PREFERRED EMBODIMENT

Figure 1:
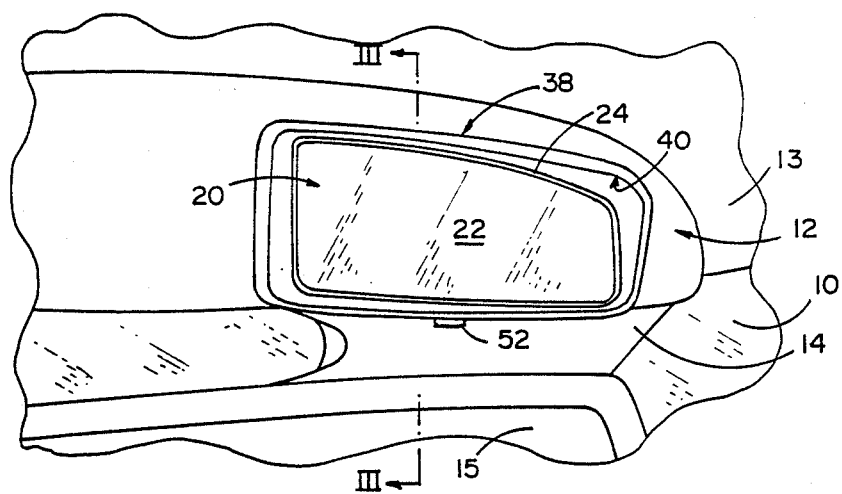
FIG. 1 is a fragmentary perspective view of a vehicle, including a conversation mirror assembly embodying the present invention.

Referring initially to FIG. 1, there is shown a portion of a vehicle having a windshield 10 above which there is mounted a housing 12 to the roof 13 of the vehicle. Extending downwardly from the interface between the windshield 10 and roof 13 is a mounting bracket 14 for a conventional rearview mirror 15 which, naturally, is located in the center line of the vehicle and faces rearwardly. In the housing 12, mounted to roof 13, there is provided the conversation mirror assembly 20 of the present invention which is best seen in the remaining FIGS. 2-5.

Figure 2:
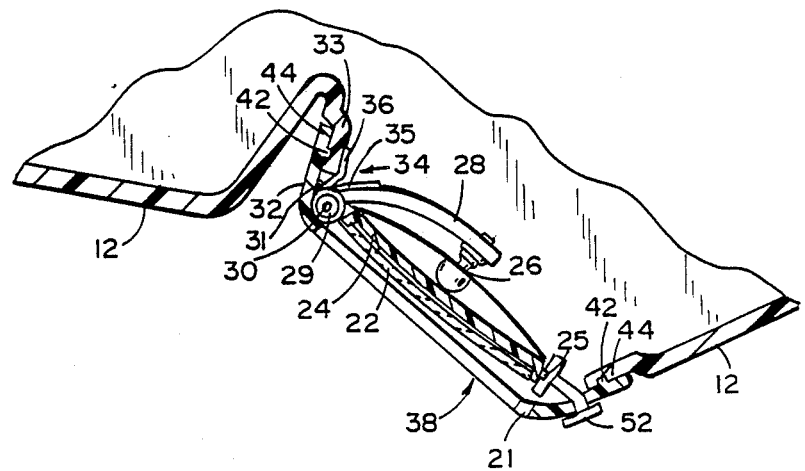
FIG. 2 is a vertical cross-sectional view of the conversation mirror assembly, shown in a retracted, stored position.
Figure 3:
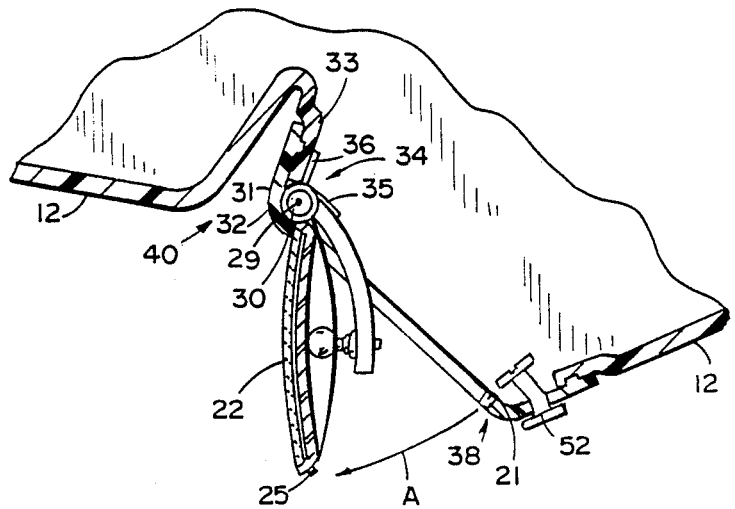
FIG. 3 is a vertical cross-sectional view taken along section lines III—III of FIG. 1 of the conversation mirror assembly in its lowered use position, as illustrated also in FIG. 1.

The conversation mirror assembly 20 includes a convex mirror 22, mounted in a mirror frame 24, supported at its rear by ball and socket assembly 26 to a pivot arm 28. Curved arm 28 can be rectangular in cross section and extends from the ball and socket joint 26 at one end to a pivot axle 30 which extends transversely (i.e. horizontally) and is mounted at opposite ends to the lip 32 of a bezel 38 in spaced relationship thereto by means of spaced mounting bosses 31 (FIGS. 2 and 3). Arm 28 includes a collar 29 at its upper end which surrounds and pivots about axle 30. Arm 28 is spring loaded to urge the mirror assembly 20, downwardly and outwardly in a direction indicated by arrow A in FIG. 3 by means of a coil spring 34, having one end 35 engaging the arm 28 and an opposite end 36 engaging housing wall 33.

Assembly 20 includes a generally rectangular bezel 38 including lip 32 which surrounds the mirror opening 40 and allows the mirror assembly 20 to snap-fit over the lip 33 of housing 12 which is secured to the vehicle headliner 13 in a suitable manner such as by fastening screws. For such purpose, bezel 38 is made of a resilient, polymeric material and includes an inwardly projecting peripheral tab 42, extending inwardly from the inwardly projecting wall 32 of the bezel 38. Tab 42 can be a continuous peripheral projection or segmented and fitted within a notch 44, formed in the lip or wall 33 of housing 12. Thus, the mirror assembly 20 can be pre-assembled in bezel 38 and subsequently snap-fitted into housing 12. Alternatively, the bezel and housing can be integrated into a single member, incorporating the mirror assembly.

Figure 4:
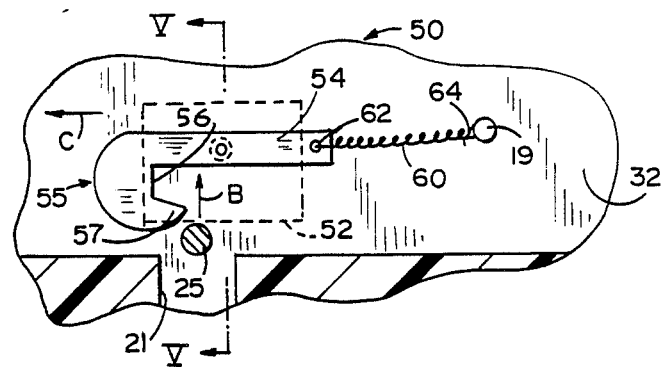
FIG. 4 is an enlarged fragmentary plan view, partly in cross section, of the latching mechanism for the conversation mirror.
Figure 5:
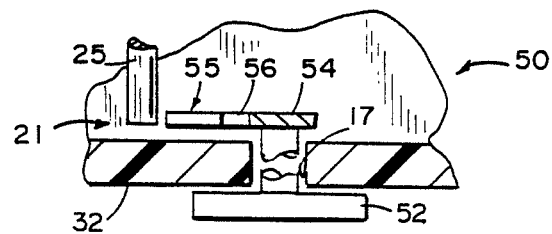
FIG. 5 is an enlarged fragmentary and cross-sectional view taken along section lines V—V of FIG. 4.

The lower edge of mirror frame 24 includes a locking pin 25, extending downwardly therefrom and which is lockably received by a spring biased latch assembly 50, as best seen in FIGS. 4 and 5. Assembly 50 includes an inverted, generally T-shaped actuating slide 52 which extends, as seen in FIGS. 2 and 3, below housing 12 and bezel 38 and slides within a guide notch 17, formed in the lip 32 of bezel 38. The top end of the T-shaped actuating slide 52 is secured to a latch bar 54, having a hook 55 at one end, defining a pin receiving notch 56. The leading edge of the hook end 55 includes an inclined edge 57, acting as a camming surface such that as pin 25 moves rearwardly in the direction indicated by arrow B in FIG. 4, latch bar 54 moves to the left as indicated by arrow C in FIG. 4 against the bias force of a bias spring 60. Spring 60 has one end 62 secured to the end of bar 54 and an opposite end 64 secured to bezel 38 by means of a suitable mounting post 19. Thus, pin 25 will push bar 54 to the left until it reaches the notch 56 after which the bar retracts, locking the pin within notch 56. The bezel 38 or housing 12 includes an entry slot 21, permitting pin 25 to travel into the latch area.

The convex mirror 22 is generally trapezoidal in shape, as is best seen in FIG. 1, and has a dimension of approximately 2½ inches by 5 inches and a curvature such that the vehicle driver of front seat passenger can see the faces of both of the rear seat passengers when the mirror is mounted to the roof 13 as illustrated. When the mirror assembly 20 is retracted within opening 40 of housing 12, as illustrated in FIG. 2, it is recessed and substantially out of the way and provides little or no distraction to either the vehicle driver or passenger. For use, the actuating slide 52 is slid to the left in the direction indicated by arrow C in FIG. 4 against the bias spring 60, allowing pin 25 to be released from notch 56 and under the bias force of spring 34 swings out to a lowered use position illustrated in FIGS. 1 and 3. The mirror can be adjusted as desired by the ball and socket 26 to establish the desired viewing effect. When not used, the mirror assembly 20 is manually pushed rearwardly to cam latch bar 54 to the left as illustrated in FIG. C until pin 25 is captured by the spring-loaded locking arm 54 within notch 56 to a stored position illustrated in FIG. 2.

Thus, with the system of the present invention, a convenient, compact conversation mirror is provided, which reduces driver distraction or discomfort in turning to establish eye contact during conversation with rear seat passengers and one which can be retracted for providing little or no distraction when not in use. It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A retractable conversation mirror assembly comprising:
    a housing adapted to be mounted to the roof of a vehicle, centrally above a vehicle windshield;
    means for retractably mounting a relatively small convex mirror to said housing for movement between a use position, such that a vehicle operator can view faces of forwardly facing rear seat passengers directly through said mirror and a stored position in which the mirror is retracted within said housing;
    wherein said means for retractably mounting said mirror comprises a mirror frame and a pivot arm including means for coupling one end of said pivot arm to said mirror frame and a pivot connection at an opposite end of said arm for pivotally coupling said arm to said housing, wherein said pivot coupling means includes bias means for urging said mirror to an extended use position, said assembly further including means for releasably holding said mirror in a retracted position within said housing; and
    wherein said means coupling said pivot arm to said mirror frame includes a ball joint.

2. The mirror assembly as defined in claim 1 wherein said means for releasably holding said mirror in a retracted position comprises a latch mounted to said housing and including bias means for urging said latch in a latching position and means mounted to said mirror frame and cooperating with said latch to be releasably held thereby.

3. The mirror assembly as defined in claim 2 wherein said housing includes a snap-fitted bezel to which said pivot arm and latch is mounted.

4. A conversation mirror assembly comprising:
    a housing adapted to be mounted to the roof of a vehicle centrally above the vehicle windshield;
    a relatively small convex mirror;
    means for mounting said mirror to said housing such that a vehicle operator can view faces of forwardly facing rear seat passengers directly through said convex mirror;
    wherein said mounting means comprises a mirror frame and a pivot arm including means for coupling one end of said pivot arm to said mirror frame and means for pivotally coupling an opposite end of said arm to said housing for movement of said mirror from a use position, extended at least partially from said housing to a stored position, retracted into said housing;
    wherein said pivot coupling means includes bias means for urging said mirror to an extended use position, said assembly further including means for releasably holding said mirror in a retracted position within said housing; and
    wherein said means coupling said pivot arm to said mirror frame includes a ball joint.

5. The mirror assembly as defined in claim 4 wherein said means for releasably holding said mirror in a retracted position comprises a latch mounted to said housing and including bias means for urging said latch in a latching position and means mounted to said mirror frame and cooperating with said latch to be releasably held thereby.

6. The mirror assembly as defined in claim 5 wherein said housing includes a snap-fitted bezel to which said pivot arm and latch is mounted.

7. A conversation mirror assembly for a vehicle for permitting a front seat occupant to see faces of forwardly facing rear seat occupants directly through the conversation mirror comprising:
    a housing mounted to the roof of the vehicle, adjacent the windshield, said housing including a mirror receiving opening formed therein;
    a mirror frame having a relatively small convex mirror mounted therein;
    a pivot rod having one end coupled to said mirror frame and a remote end pivotally coupled to said housing adjacent an upper portion of said opening;
    bias means coupled to said pivot rod for urging said rod and said mirror therein to a position extended from said housing for use of the mirror;
    means for releasably holding said mirror within said housing against the force of said bias means; and
    a pivot axle mounted to said housing and extending through said remote end of said pivot rod and wherein said bias means comprises a spring extending in co-axial relationship to said pivot rod and having one end engaging said housing and an opposite end engaging said pivot rod.

8. The assembly as defined in claim 7 wherein said means for releasably holding said mirror within said housing comprises latching means extending between said mirror frame and said housing.

9. The assembly as defined in claim 8 wherein said latching means comprises a pin extending downwardly from a lower edge of said mirror frame and a biased latch bar mounted to said housing to releasably capture said pin.

* * * * *